United States Patent

Ogawa

[11] Patent Number: 6,129,968
[45] Date of Patent: Oct. 10, 2000

[54] PHASE CHANGE RECORDING MEDIUM AND METHOD FOR RECORDING THEREIN AND REPRODUCTION THEREFROM

[75] Inventor: Masatsugu Ogawa, Tokyo, Japan

[73] Assignee: NEC Corporation, Tokyo, Japan

[21] Appl. No.: 09/201,244

[22] Filed: Nov. 30, 1998

[30] Foreign Application Priority Data

Nov. 28, 1997 [JP] Japan ................................. 9-328807

[51] Int. Cl.$^7$ ........................................................ B32B 3/00
[52] U.S. Cl. ...................... 428/64.1; 428/64.2; 428/64.4; 428/64.5; 428/64.6; 428/913; 430/270.13; 430/495.1; 430/945; 369/283; 369/288
[58] Field of Search ................................ 428/64.1, 64.2, 428/64.4, 64.5, 64.6, 457, 913; 430/270.13, 495.1, 945; 369/275.1, 283, 288

[56] References Cited

U.S. PATENT DOCUMENTS

| | | | |
|---|---|---|---|
| 5,862,122 | 1/1999 | Okada | 369/275.2 |
| 5,974,025 | 10/1999 | Yamada | 369/288 |
| 6,040,030 | 3/2000 | Utsunomiya | 428/64.1 |
| 6,040,066 | 3/2000 | Zhou | 428/64.1 |

*Primary Examiner*—Elizabeth Evans
*Attorney, Agent, or Firm*—Foley & Lardner

[57] ABSTRACT

Disclosed is a phase change recording medium comprising a crystal section and an amorphous section, characterized in that the difference in reflectivity between the crystal section and the amorphous section is, for example, 15% or more when light with a wavelength of $\lambda_1$ is applied and the difference in absorptivity between the crystal section and the amorphous section is, for example, 5% or less when light with a wavelength of $\lambda_2$ is applied. Recording using light with a wavelength of $\lambda_2$ brings about few opportunities of occurrence of cross-erasure because of a small difference in absorptivity between the crystal section and the amorphous section. Reproduction using light with a wavelength of $\lambda_1$ after the recording using light with a wavelength of $\lambda_2$ results in the production of satisfactorily regenerative signals because of a large difference in reflectivity between the crystal section and the amorphous section.

19 Claims, 1 Drawing Sheet

5 REFLECTING FILM
4 PROTECTIVE FILM
3 RECORDING FILM
2 INTERFERENCE FILM
1 SUBSTRATE

LIGHT

PHASE CHANGE RECORDING MEDIUM AND METHOD FOR RECORDING THEREIN AND REPRODUCTION THEREFROM

BACKGROUND OF THE INVENTION

The present invention relates to a phase change recording medium and to a method for recording in and reproduction from the recording medium, and more particularly to arts of a phase change recording medium and a method for recording in and reproduction from the recording medium to attain high-density recording.

The phase change recording media are those which use, as a recording film, materials exhibiting a reversible between a crystal state and an amorphous state. Chalcogenide materials are known as materials used for recording films of such phase change recording media. Examples of such chalcogenide materials include a GeSbTe-type, InSbTe-type, InSe-type, InTe-type, AsTeGe-type, $TeO_x$-GeSn-type, TeSeSn-type, SbSeBi-type, BiSeGe-type and AgInSbTe-type.

A general phase change recording medium is of the disk shape. It is provided with a guide concave and convex sections formed on a substrate. The projections (convex sections) and the concave sections are termed the land and the groove respectively.

With recent development of highly densified phase change recording media, the land-groove recording system has been proposed in which records are written in both of the land and groove. In this land-groove recording system, the distance between the recording marks which are adjacent to each other is small and hence the problem (cross-erasure) arises in which the adjacent marks which have been recorded are erased in the recording step.

JP-A-124211/1996 discloses an art which can solve this cross-erasure.

This art, however, requires to make the film thicknesses of the land and groove different from each other, which is troublesome in the production of the medium and hence uneconomical.

SUMMARY OF THE INVENTION

The objective of the present invention is to solve the above-mentioned tasks.

Moreover, the objective of the invention is to provide a phase change medium which can cope with high density recording and reduce cross-erasure.

Furthermore, the objective of the present invention is to provide at a moderate cost a phase change medium which can cope with high density recording and reduce cross-erasure.

Still furthermore, the objective of the present invention is to provide a recording and reproduction method which can cope with high density recording and reduce cross-erasure where a phase change recording medium is used.

Meanwhile, the cross-erasure is caused by the difference in absorptivity between the amorphous section (recording mark) and the crystal section (non-recording mark).

In general, the absorptivity of the amorphous section is high whereas the absorptivity of the crystal section is low. The recording power is designed so that the crystal section whose absorptivity is low can be melted. Such a recording power is therefore greater than that required for the amorphous section whose absorptivity is high. When a beam spot is overlapped on recorded marks, which are adjacent to each other, in the recording step, the amorphous section with a high absorptivity absorbs a lot of light which raises the temperature whereby the recorded marks are erased.

In light of this it is desirable that the difference in absorptivity between the crystal section and the amorphous section be made small to reduce cross-erasure.

Such a reduction in the difference in absorptivity between the crystal section and the amorphous section results in an insufficient output.

In view of this situation, the present inventors have solved the foregoing contrary problems by separating a light for recording from a light for reproduction.

Specifically, the phase change recording medium of the present invention is designed so that the difference in reflectivity between the crystal section and the amorphous section is, for example, 15% or more when light with a wavelength of $\lambda_1$ is applied and that the difference in absorptivity between the crystal section and the amorphous section is, for example, 5% or less when light with a wavelength of $\lambda_2$ is applied. Accordingly, when light with a wavelength of $\lambda_2$ is used to record, the cross-erasure does not tend to occur because the difference in absorptivity between the crystal section and the amorphous section is small. When light with a wavelength of $\lambda_1$ is used to reproduce after the recording using light with a wavelength of $\lambda_2$ is finished, satisfactory regenerative signals can be obtained because the difference (proportional to the output of the regenerative signals) in reflectivity between the crystal section and the amorphous section is large.

The first and second objectives of the present invention are achieved by the provision of a phase change recording medium comprising an amorphous section and a crystal section, wherein the amorphous section differs from the crystal section in reflectivity for light with a wavelength of $\lambda_1$ so that the amorphous section is discernible from the crystal section and in absorptivity for light with a wavelength of $\lambda_2$ so that the crystal section can be converted into an amorphous without crystallizing the amorphous section surrounding the crystal section.

The first and second objectives of the present invention can also be achieved by the provision of a phase change recording medium comprising a substrate, an interference film formed on the substrate, a recording film formed on the interference film, a protective film formed on the recording film and a reflecting film formed on the protective film, the recording film being provided with an amorphous section and a crystal section, wherein the substrate, the interference film, the recording film, the protective film and the reflecting film are structured so as to satisfy the following formulae (1) and (2):

$$|R_{cyr} - R_{amo}| \geq 15\% \tag{1}$$

$$|A_{ncyr} - A_{namo}| \leq 5\% \tag{2}$$

wherein $R_{cyr}$ is a reflectivity when light with a wavelength of $\lambda_1$ is emitted from the side of the substrate to the crystal section, $R_{amo}$ is a reflectivity when light with a wavelength of $\lambda_1$ is emitted from the side of the substrate to the amorphous section, $A_{ncyr}$ is a absorptivity of the crystal section when light with a wavelength of $\lambda_2$ is emitted from the side of the substrate to the crystal section and $A_{namo}$ is a absorptivity of the amorphous section when light with a wavelength of $\lambda_2$ is emitted from the side of the substrate to the amorphous section;

$$\text{Reflectivity } R = E_L(m+1)^2 / E_R(m+1)^2 \times 100$$

Absorptivity $A_n$ in the recording film $$= \frac{N_n(E'_R(n)^2 - E'_L(n)^2)}{N_{m+1} \cdot E_R(m+1)^2} - \frac{N_n(E_R(n)^2 - E_L(n)^2)}{N_{m+1} \cdot E_R(m+1)^2} - \frac{2K_n(\text{Im}[E'_L(n) \cdot E'^*_R(n)] - \text{Im}[E_L(n) \cdot E^*_R(n)])}{N_{m+1} \cdot E_R(m+1)^2}$$

$$\begin{pmatrix} E'_R(n) \\ E'_L(n) \end{pmatrix} = \begin{pmatrix} e^{j\phi n} & 0 \\ 0 & e^{-j\phi n} \end{pmatrix} \cdot \begin{pmatrix} E_R(n) \\ E_L(n) \end{pmatrix}$$

$$\begin{pmatrix} E_R(n+1) \\ E_L(n+1) \end{pmatrix} = \frac{1}{2} \begin{pmatrix} 1 + Y_n/Y_{n+1} & 1 - Y_n/Y_{n+1} \\ 1 - Y_n/Y_{n+1} & 1 + Y_n/Y_{n+1} \end{pmatrix} \cdot \begin{pmatrix} E'_R(n) \\ E'_L(n) \end{pmatrix}$$

wherein $E_R(n)$ is an electrical field heading for the (n−1)th layer from the (n)th layer when light is emitted from the side of the substrate, $E_L(n)$ is an electrical field heading for the (n)th layer from the (n−1)th layer when light is emitted from the side of the substrate, $E_R'(n)$ is an electrical field heading for the (n)th layer from the (n+1)th layer when light is emitted from the side of the substrate and $E_L'(n)$ is an electrical field heading for the (n+1)th layer from the (n)th layer when light is emitted from the side of the substrate;

the substrate corresponds to the fifth layer, the recording film corresponds to the third layer, the (0)th layer corresponds to an air layer on the side opposite to the incident light and hence, m+1=6 and n is 3; Im means an imaginary number section, (*) means a complex conjugate;

$Y_n = N_n - iK_n$ wherein $N_n$ and $K_n$ indicate the real number section and imaginary number section of the complex reflective index of the (n)th layer respectively;

$N_{m+1}$ indicates the real number section of the complex reflective index of the substrate; and $\phi n = (2\pi/\lambda) \cdot Y_n \cdot t_n$ wherein $\lambda$ is a wavelength of the light used and $t_n$ is a film thickness of the (n)th layer.

The above-mentioned third objective can be achieved by the provision of a recording and reproduction method comprising steps of applying a laser light with a wavelength of $\lambda_2$ to the aforementioned phase change recording medium to record signals and applying a laser light with a wavelength of $\lambda_1$ to reproduce the signals recorded using the laser light with a wavelength of $\lambda_2$.

In the invention, the difference in reflectivity ($|R_{cyr} - R_{amo}|$) is 15% or more (particularly, between 20 and 25%) and the difference in absorptivity ($|A_{ncyr} - A_{namo}|$) is 5% or less (particularly, between 0 and 3%). These limitations enable it possible to cope with high density recording and to reduce the cross-erasure.

These wavelengths $\lambda_1$ and $\lambda_2$ satisfy the relation: $\lambda_1 < \lambda_2$. In particular, these wavelengths $\lambda_1$ and $\lambda_2$ are 640 nm and 780 nm respectively. The light with a wavelength of $\lambda_2$ is used when signals are recorded in a recording medium and the light with a wavelength of $\lambda_1$ is used when the signals recorded using the light with a wavelength of $\lambda_2$ is reproduced.

Preferably the above-mentioned recording film is constructed of a chalcogenide material. For instance, the recording film may be constructed of a GeSbTe-type, InSbTe-type, InSe-type, InTe-type, AsTeGe-type, $TeO_x$-GeSn-type, TeSeSn-type, SbSeBi-type, BiSeGe-type, AgInSbTe-type, or the like. Particularly preferably the recording film is constructed of $Ge_2Sb_2Te_5$.

Preferably the above-mentioned interference film and protective film are constructed of a dielectric material.

Preferably the above-mentioned reflecting film is constructed of Al or AlTi.

These interference film, recording film, protective film and reflecting film may be formed using a thin-film formation technology, for example, a sputtering method. In particular, the conditions of the above formulae (1) and (2) can be satisfied by controlling the film thickness and the like of each of the interference film, recording film, protective film and reflecting film which are formed using, particularly, a sputtering method or the like.

Incidentally, the descriptions of "Magneto-optical disk with reflecting layers (Proceedings SPIE Vo. 382, p252 (1983)" can serve as a reference to the formulae (1) and (2).

There are proposals for phase change recording media used in the methods in which light with a wavelength of 830 nm is used to record and light with a wavelength of 670 nm is used to reproduce (JP-A-62248/1993 and JP-A-338077/1994).

These proposed inventions are not directed to the object of reducing cross-erasure. These inventions were made on the basis of the conception of how to improve the resolution by using a short wave laser, by which a high output cannot be obtained, in the reproduction step. In addition, none of these proposed inventions meet the requirements of the present invention and hence can reduce cross-erasure.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
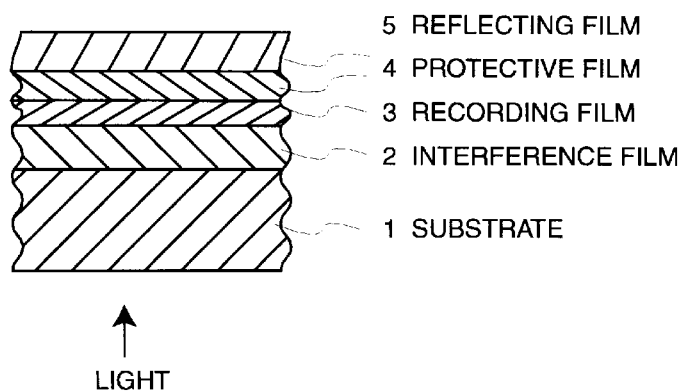
FIG. 1 is a schematically sectional view of a phase change recording medium.

FIG. 1 is a schematically sectional view showing an embodiment of a phase change recording medium according to the present invention.

The phase change recording medium of the present invention comprises a substrate 1, an interference film 2, a recording film 3, a protective film 4 and a reflecting film 5. The interference film 2 is formed on the substrate 1 by sputtering or the like. The recording film 3 is formed on the interference film 2 by sputtering or the like. The protective film 4 is formed on the recording film 3 by sputtering or the like. The reflecting film 5 is formed on the protective film 4 by sputtering or the like.

The substrate 1 is formed using a transparent material including a synthetic resin such as a polycarbonate and acrylic resins or glass. The substrate 1 is disk- or card-like in shape.

The interference film 2 and the protective film 4 are constructed of a dielectric material, for example, $ZnS-SiO_2$.

The recording film 3 is formed using a chalcogenide type material. A phase change material such as a GeSbTe-type, InSbTe-type, InSe-type, InTe-type, AsTeGe-type, $TeO_x$-GeSn-type, TeSeSn-type, SbSeBi-type, BiSeGe-type or AgInSbTe-type may be used for the recording film 3. The recording film 3 may be constructed of $Ge_2Sb_2Te_5$ in particular.

The reflecting film 5 may be constructed of Al, AlTi, or the like.

The thickness and refractive index of each of the substrate 1, interference film 2, recording film 3, protective film 4 and reflecting film 5 are controlled to satisfy the foregoing formulae (1) and (2).

The above-mentioned structural measures enable it possible to produce the phase change recording medium of the present invention.

The present invention will be explained in detail by way of examples.

EXAMPLE 1

The thickness and the like of a phase change recording medium in this example were designed to satisfy the formulae (1) and (2).

A substrate 1 was a polycarbonate substrate with a track pitch of 0.56 μm, a thickness of 0.6 mm, and a diameter of 120 mm.

A ZnS-SiO$_2$ film (an interference film 2) with a thickness of 170 nm was formed on the substrate 1 by sputtering.

A Ge$_2$Sb$_2$Te$_5$ film (a recording film 3) with a thickness of 12 nm was formed on the interference film 2 by sputtering.

A ZnS-SiO$_2$ film (a protective film 4) with a thickness of 30 nm was formed on the recording film 3 by sputtering.

An AlTi film (a reflecting film 5) with a thickness of 80 nm was formed on the protective film 4 by sputtering.

The reflectivity and absorptivity of each of a crystal section and amorphous section in the above phase change medium were those shown in the following Table 1.

TABLE 1

| Wavelength | $\lambda_1$ (640 nm) | | $\lambda_2$ (780 nm) | |
| --- | --- | --- | --- | --- |
| | Crystal section | Amorphous section | Crystal section | Amorphous section |
| Reflectivity | 23% | 1% | 10% | 10% |
| Absorptivity | 70% | 85% | 75% | 75% |

Specifically, the difference in reflectivity for light with a wavelength of 640 nm is 22% and the difference in absorptivity for light with a wavelength of 780 nm is 0%.

Next, a laser light with a wavelength of 780 nm was used to record signals and a laser light with a wavelength of 640 nm was used to reproduce the signals.

In the recording, signals with a recording frequency of 2 MHz were recorded in the groove section at a linear velocity of 5.8 m/s using the recording/erasing power (optimum recording power) which will make the duty ratio to be 50%.

The signals were reproduced with the result that an excellent C/N (58 dB) was obtained.

Also the same result was obtained in the land.

Figure 2:
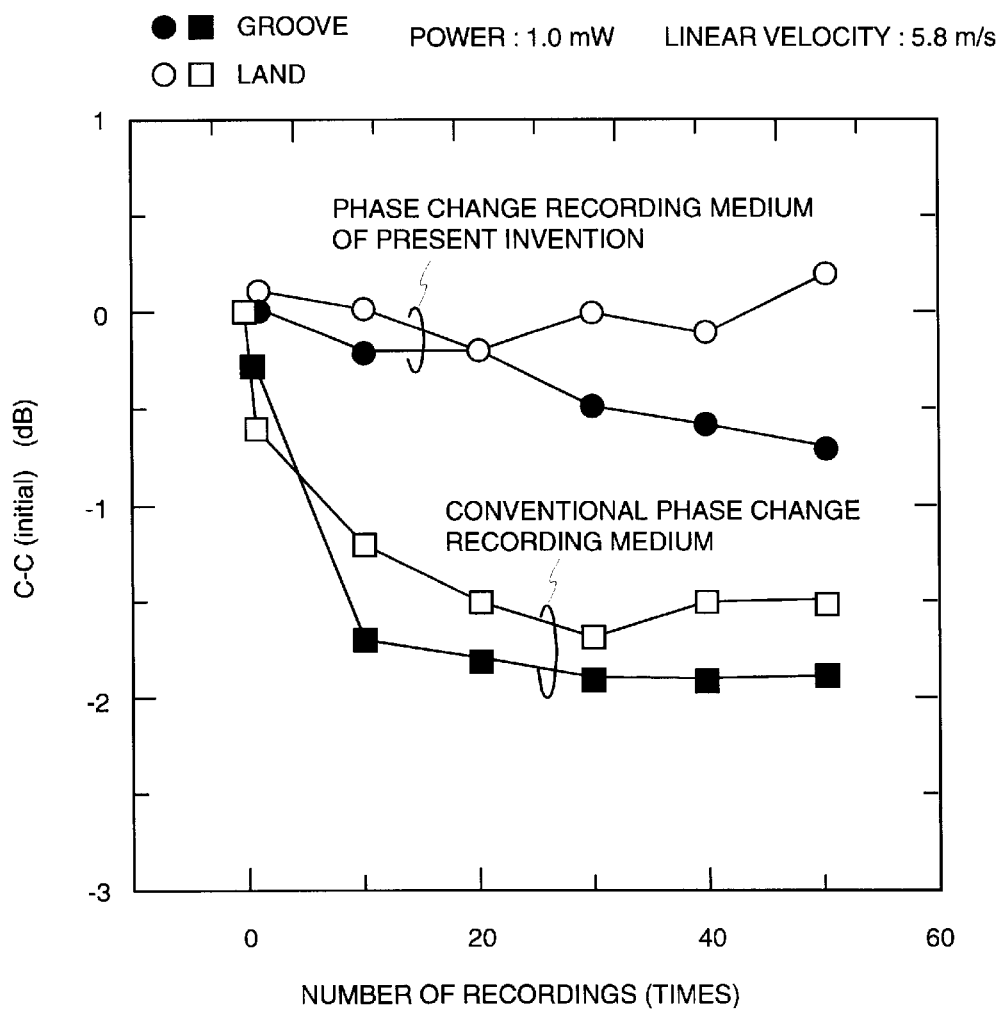
FIG. 2 is a graph illustrating cross-erasure.

Next, signals with a frequency of 3 MHz were recorded in the adjacent land track using the optimum recording power for the land. At this time, 2 MHz signals recorded in the groove were examined for a reduction in the carrier level. Namely the examination was carried out for cross-erasure. The results are shown in FIG. 2, in which the axis of abscissa indicates the number of recordings in the adjacent land. Incidentally, a recording operation was performed using light with a wavelength of 780 nm and a reproduction operation was carried out using light with a wavelength of 640 nm.

As a result from the above examinations, the product of the present invention is featured in that a reduction in the carrier level is restrained within 1 dB even when the number of recordings reaches into 50.

The land was subjected to the same tests and as a consequence the same results were obtained as shown in FIG. 2. The cross-erasure was restrained within 1 dB.

COMPARATIVE EXAMPLE 1

A phase change recording medium was produced in the same manner as in Example 1. The medium prepared in this Comparative Example 1 was the same as the medium prepared in Example 1 except that the thickness of the interference film 2 (ZnS-SiO$_2$ film) was 180 nm, the thickness of the recording film 3 (Ge$_2$Sb$_2$Te$_5$ film) was 25 nm, and the thickness of the protective film 4 (ZnS-SiO$_2$ film) was 30 nm.

The reflectivity and absorptivity of each of the crystal section and amorphous section in the phase change medium prepared in this Comparative Example were those shown in the following Table 2.

TABLE 2

| Wavelength | $\lambda_1$ (640 nm) | | $\lambda_2$ (780 nm) | |
| --- | --- | --- | --- | --- |
| | Crystal section | Amorphous section | Crystal section | Amorphous section |
| Reflectivity | 23% | 1% | 25% | 2% |
| Absorptivity | 70% | 85% | 69% | 83% |

Specifically, the difference in reflectivity for light with a wavelength of 640 nm is 22%. However the difference in absorptivity for light with a wavelength of 780 nm is as much as 14%.

The same recording and reproduction procedures as in Example 1 were carried out to examine for cross-erasure. The results are shown in FIG. 2. It is confirmed from FIG. 1 that a cross-erasure of near 2 dB exists both in the land and in the groove.

Also, a recording and reproduction operation in the phase change recording medium prepared in this Comparative Example were performed using light with a wavelength of 640 nm. In this event, the carrier was reduced by about 2 dB when the recording operation in the adjacent track was performed 50 times. This indicates that conventional recording media can restrain cross-erasure with difficulty. Thus it is difficult to produce recording media with high density by conventional method.

The entire disclosure of Japanese Patent Application No. 9-328807 filed on Nov. 28, 1997 including specification, claims, drawing and summary are incorporated herein by reference in its entirety.

What is claimed is:

1. A phase change recording medium comprising:
   an amorphous section, and
   a crystal section,
   wherein
      the amorphous section differs from the crystal section in reflectivity for light with a wavelength of $\lambda_1$ so that the amorphous section is discernible from the crystal section and in absorptivity for light with a wavelength of $\lambda_2$ so that the crystal section can be converted into an amorphous without crystallizing the amorphous section surrounding the crystal section.

2. The phase change recording medium of claim 1, wherein said difference in reflectivity is 15% or more and said difference in absorptivity is 5% or less.

3. The phase change recording medium of claim 1, wherein said difference in reflectivity is in a range from 20 to 25% and said difference in absorptivity is in a range from 0 to 3%.

4. The phase change recording medium of claim 1, wherein said wavelength $\lambda_1$ and said wavelength $\lambda_2$ satisfy the relation: $\lambda_1 < \lambda_2$.

5. The phase change recording medium of claim 1, wherein said wavelength $\lambda_1$ is 640 nm and said wavelength $\lambda_2$ is 780 nm.

6. The phase change recording medium of claim 1, wherein said light with a wavelength of $\lambda_2$ is used when signals are recorded in said recording medium and said light with a wavelength of $\lambda_1$ is used when said signals recorded using said light with a wavelength of $\lambda_2$ is reproduced.

7. A phase change recording medium comprising:
a substrate,
an interference film formed on the substrate,
a recording film formed on the interference film,
a protective film formed on the recording film; and
a reflecting film formed on the protective film;
said recording film being provided with an amorphous section and a crystal section,
wherein
the substrate, the interference film, the recording film, the protective film and the reflecting film are structured so as to satisfy the following formulae (1) and (2):

$$|R_{cyr} - R_{amo}| \geq 15\% \qquad (1)$$

$$|A_{ncyr} - A_{namo}| \leq 5\% \qquad (2)$$

wherein $R_{cyr}$ is a reflectivity when light with a wavelength of $\lambda_1$ is emitted from the side of the substrate to the crystal section, $R_{amo}$ is a reflectivity when light with a wavelength of $\lambda_1$ is emitted from the side of the substrate to the amorphous section, $A_{ncyr}$ is a absorptivity of the crystal section when light with a wavelength of $\lambda_2$ is emitted from the side of the substrate to the crystal section and $A_{namo}$ is a absorptivity of the amorphous section when light with a wavelength of $\lambda_2$ is emitted from the side of the substrate to the amorphous section;

Reflectivity $R = E_L(m+1)^2 / E_R(m+1)^2 \times 100$

Absorptivity $A_n$ in the recording film $$= \frac{N_n(E'_R(n)^2 - E'_L(n)^2)}{N_{m+1} \cdot E_R(m+1)^2} - \frac{N_n(E_R(n)^2 - E_L(n)^2)}{N_{m+1} \cdot E_R(m+1)^2} - \frac{2K_n(\text{Im}[E'_L(n) \cdot E'^*_R(n)] - \text{Im}[E_L(n) \cdot E^*_R(n)])}{N_{m+1} \cdot E_R(m+1)^2}$$

$$\begin{pmatrix} E'_R(n) \\ E'_L(n) \end{pmatrix} = \begin{pmatrix} e^{j\phi n} & 0 \\ 0 & e^{-j\phi n} \end{pmatrix} \cdot \begin{pmatrix} E_R(n) \\ E_L(n) \end{pmatrix}$$

$$\begin{pmatrix} E_R(n+1) \\ E_L(n+1) \end{pmatrix} = \frac{1}{2} \begin{pmatrix} 1 + Y_n/Y_{n+1} & 1 - Y_n/Y_{n+1} \\ 1 - Y_n/Y_{n+1} & 1 + Y_n/Y_{n+1} \end{pmatrix} \cdot \begin{pmatrix} E'_R(n) \\ E'_L(n) \end{pmatrix}$$

wherein $E_R(n)$ is an electrical field heading for the (n−1)th layer from the (n)th layer when light is emitted from the side of the substrate, $E_L(n)$ is an electrical field heading for the (n)th layer from the (n−1)th layer when light is emitted from the side of the substrate, $E_R'(n)$ is an electrical field heading for the (n)th layer from the (n+1)th layer when light is emitted from the side of the substrate and $E_L'(n)$ is an electrical field heading for the (n+1)th layer from the (n)th layer when light is emitted from the side of the substrate;

the substrate corresponds to the fifth layer, the recording film corresponds to the third layer, the (0)th layer corresponds to an air layer on the side opposite to the incident light and hence, m+1=6 and n is 3;

Im means an imaginary number section, (*) means a complex conjugate;

$Y_n = N_n - iK_n$ wherein $N_n$ and $K_n$ indicate the real number section and imaginary number section of the complex reflective index of the (n)th layer respectively;

$N_{m+1}$ indicates the real number section of the complex reflective index of the substrate; and $$\phi n = (2\pi/\lambda) \cdot Y_n \cdot t_n$$

wherein $\lambda$ is a wavelength of the light used and $t_n$ is a film thickness of the (n)th layer.

8. The phase change recording medium of claim 7, wherein said $|R_{cyr} - R_{amo}|$ is from 20 to 25% and said $|A_{ncyr} - A_{namo}|$ is from 0 to 3%.

9. The phase change recording medium of claim 7, wherein said wavelength $\lambda_1$ and said wavelength $\lambda_2$ satisfy the relation: $\lambda_1 < \lambda_2$.

10. The phase change recording medium of claim 7, wherein said wavelength $\lambda_1$ is 640 nm and said wavelength $\lambda_2$ is 780 nm.

11. The phase change recording medium of claim 7, wherein said light with a wavelength of $\lambda_2$ is used when signals are recorded in said recording medium and said light with a wavelength of $\lambda_1$ is used when said signals recorded using said light with a wavelength of $\lambda_2$ is reproduced.

12. The phase change recording medium of claim 7, wherein said recording film comprises a chalcogenide-type material.

13. The phase change recording medium of claim 7, wherein said recording film comprises $Ge_2Sb_2Te_5$.

14. The phase change recording medium of claim 7, wherein said interference film and said protective film comprise a dielectric material.

15. The phase change recording medium of claim 7, wherein said reflecting film comprises Al or AlTi.

16. A recording and reproduction method comprising steps of:
applying a laser light with a wavelength of $\lambda_2$ to a phase change recording medium to record signals, and
applying a laser light with a wavelength of $\lambda_1$ to reproduce the signals recorded using the laser light with a wavelength of $\lambda_2$,
said phase change recording medium comprising;
a substrate,
an interference film formed on the substrate,
a recording film formed on the interference film,
a protective film formed on the recording film; and
a reflecting film formed on the protective film;
said recording film being provided with an amorphous section and a crystal section,
wherein
the substrate, the interference film, the recording film, the protective film and the reflecting film are structured so as to satisfy the following formulae (1) and (2):

$$|R_{cyr} - R_{amo}| \geq 15\% \qquad (1)$$

$$|A_{ncyr} - A_{namo}| \leq 5\% \qquad (2)$$

wherein $R_{cyr}$ is a reflectivity when light with a wavelength of $\lambda_1$ is emitted from the side of the substrate to the crystal section, $R_{amo}$ is a reflectivity when light with a wavelength of $\lambda_1$ is emitted from the side of the substrate to the amorphous section, $A_{ncyr}$ is a absorptivity of the crystal section when light with a wavelength of $\lambda_2$ is emitted from the side of the substrate to the crystal section and $A_{namo}$ is a absorptivity of the amorphous section when light with a wavelength of $\lambda_2$ is emitted from the side of the substrate to the amorphous section;

Reflectivity $R = E_L(m+1)^2 / E_R(m+1)^2 \times 100$

Absorptivity $A_n$ in the recording film $$= \frac{N_n(E'_R(n)^2 - E'_L(n)^2)}{N_{m+1} \cdot E_R(m+1)^2} - \frac{N_n(E_R(n)^2 - E_L(n)^2)}{N_{m+1} \cdot E_R(m+1)^2} - \frac{2K_n(\text{Im}[E'_L(n) \cdot E'^*_R(n)] - \text{Im}[E_L(n) \cdot E^*_R(n)])}{N_{m+1} \cdot E_R(m+1)^2}$$

$$\begin{pmatrix} E'_R(n) \\ E'_L(n) \end{pmatrix} = \begin{pmatrix} e^{j\phi n} & 0 \\ 0 & e^{-j\phi n} \end{pmatrix} \cdot \begin{pmatrix} E_R(n) \\ E_L(n) \end{pmatrix}$$

$$\begin{pmatrix} E_R(n+1) \\ E_L(n+1) \end{pmatrix} = \frac{1}{2} \begin{pmatrix} 1 + Y_n/Y_{n+1} & 1 - Y_n/Y_{n+1} \\ 1 - Y_n/Y_{n+1} & 1 + Y_n/Y_{n+1} \end{pmatrix} \cdot \begin{pmatrix} E'_R(n) \\ E'_L(n) \end{pmatrix}$$

wherein $E_R(n)$ is an electrical field heading for the (n−1)th layer from the (n)th layer when light is emitted from the side of the substrate, $E_L(n)$ is an electrical field heading for the (n)th layer from the (n−1)th layer when light is emitted from the side of the substrate, $E_R'(n)$ is an electrical field heading for the (n)th layer from the (n+1)th layer when light is emitted from the side of the substrate and $E_L'(n)$ is an electrical field heading for the (n+1)th layer from the (n)th layer when light is emitted from the side of the substrate;

the substrate corresponds to the fifth layer, the recording film corresponds to the third layer, the (0)th layer corresponds to an air layer on the side opposite to the incident light and hence, m+1=6 and n is 3;

Im means an imaginary number section, (*) means a complex conjugate;

$Y_n = N_n - iK_n$ wherein $N_n$ and $K_n$ indicate the real number section and imaginary number section of the complex reflective index of the (n)th layer respectively;

$N_{m+1}$ indicates the real number section of the complex reflective index of the substrate; and $\phi n = (2\pi/\lambda) \cdot Y_n \cdot t_n$ wherein $\lambda$ is a wavelength of the light used and $t_n$ is a film thickness of the (n)th layer.

17. The recording and reproduction method of claim 16, wherein said $|R_{cyr} - R_{amo}|$ is from 20 to 25% and said $|A_{ncyr} - A_{namo}|$ is from 0 to 3%.

18. The recording and reproduction method of claim 16, wherein said wavelength $\lambda_1$ and said wavelength $\lambda_2$ satisfy the relation: $\lambda_1 < \lambda_2$.

19. The recording and reproduction method of claim 16, wherein said wavelength $\lambda_1$ is 640 nm and said wavelength $\lambda_2$ is 780 nm.

* * * * *